United States Patent [19]

Ihm et al.

[11] Patent Number: 5,445,778
[45] Date of Patent: Aug. 29, 1995

[54] METHOD FOR THE PRODUCTION OF ALIPHATIC COPOLYESTER FILM

[75] Inventors: Dae W. Ihm; Dae J. Kim; Young J. Kim, all of Seoul; Myung S. Lee, Suwon; Chang S. Lee, Anyang, all of Rep. of Korea

[73] Assignee: Cheil Synthetics Inc., Kyungsan, Rep. of Korea

[21] Appl. No.: 321,513

[22] Filed: Oct. 12, 1994

[30] Foreign Application Priority Data

Nov. 3, 1993 [KR] Rep. of Korea ............... 93-23173

[51] Int. Cl.$^6$ ............................................. B29C 47/00
[52] U.S. Cl. ........................... 264/176.1; 528/272; 528/275; 528/296; 528/301; 528/302; 264/165
[58] Field of Search ............... 428/272, 275, 296, 301, 428/302; 264/176.1, 165, DIG. 47

[56] References Cited

U.S. PATENT DOCUMENTS

| | | | |
|---|---|---|---|
| 4,166,873 | 9/1979 | Gilliam et al. | 428/35 |
| 4,894,430 | 1/1990 | Hohlein et al. | 528/75 |
| 4,910,292 | 3/1990 | Blount | 528/272 |
| 4,971,863 | 11/1990 | Hart | 428/458 |
| 4,983,711 | 1/1991 | Sublett et al. | 528/272 |
| 5,306,787 | 4/1994 | Takiyama et al. | 525/440 |
| 5,310,782 | 5/1994 | Takiyama et al. | 524/706 |
| 5,328,745 | 7/1994 | Kurihara et al. | 428/141 |

FOREIGN PATENT DOCUMENTS 4189822 7/1992 Japan .
4189823 7/1992 Japan .

*Primary Examiner*—Samuel A. Acquah
*Attorney, Agent, or Firm*—Nikaido, Marmelstein, Murray & Oram

[57] ABSTRACT

There is disclosed a method for the production of aliphatic copolyester film.

The method comprises the steps of: applying esterification or ester-interchange to a reaction mixture of at least one acid component selected from the group consisting of succinic acid, succinic anhydride and succinic acid ester, 1,4-butanediol as a main diol component, 2,2-dimethyl-1,3-propanediol of 1 to 30% by mole based on the mole of the acid component, multifunctional compound 0.01 to 1% by mole, based on the mole of the acid component, multifunctional compound have more than three functional group of hydroxy group or carboxy group at below 220° C., so as to give an oligomer mixture; polycondensing the oligomer into an aliphatic copolyester at a temperature of 240° to 260° C. under reduced pressures of not more than 1 mmHg in the presence of a catalyst; and melt-extruding the aliphatic copolyester using T die.

Improved in draw ratio, the aliphatic copolyester film provided by the method can be applied to various applications, such as films, bottles, glass fiber-reinforced plastics, adhesives, paints.

3 Claims, No Drawings

METHOD FOR THE PRODUCTION OF ALIPHATIC COPOLYESTER FILM

BACKGROUND OF THE INVENTION

1. Field of the invention

The present invention relates, in general, to a novel method for producing films with an aliphatic copolyester and, more particularly, to an improvement in the draw ratio of the films along with the method.

2. Description of the Prior Art

Aromatic polyesters, especially polyethylene terephthalate, are superior in physical and chemical properties and are widely used to make various applications, such as films, bottles, glass fiber-reinforced plastics, adhesives, paints and the like.

In contrast, aliphatic polyesters, although used in the forms of paint or adhesive, lacks of processability, especially moldability to film. In addition, it is difficult to derive desired melt viscosity and melt strength therefrom. Furthermore, the films of aliphatic polyester, if formed, are poor in mechanical physical properties. That is to say, when aliphatic compounds are employed as the dicarboxylic acid and glycol components for polyester, the polyester, even if obtained by polycondensation after esterification or ester-interchange, is not endowed with enough melt viscosity or melt strength to be formed or processed into a film. Although it is formed and processed into a film, the final product is very inferior in workability and mechanical physical properties.

In order to improve the mechanical physical properties and melt strength, mainly used is a method of increasing the molecular weight thereof. In this method, however, it is of importance to appropriately control the increase of the molecular weight because too large molecular weight of the polyester may cause to raise the melt viscosity overly, which in turn results in difficulty in passing through an extruder on processing.

With regard to the melt strength of a polymer, it chiefly depends on the elasticity of a polymer melt. Exemplary factors affecting the elasticity include the distribution of molecular weight, the extent of branch, the kind and amount of additives. As the molecular weight is large, as the extent of branch is high and as the entanglement of polymer melt is serious, the elasticity becomes enhanced. In case of polyester, full well is it known that stearic acid, or talc or silica particle brings the melt strength into effect.

In addition, crystallization rate is another factor having great influence on the moldability of a polymer. The crystallization rate and crystallinity of a polymer can be controlled according to a processing method and thus, it also is of importance.

Japanese Patent Laid-Open Publication Nos. Heisei 4-189822 and 4-189823 disclose methods for producing polymers with enhanced melt viscosity and melt strength in which aliphatic dicarboxylic acids and aliphatic divalent glycols are subjected to esterification and polycondensation and then added with isocyanate compounds, to increase the molecular weights of the polymers. However, these methods are uneconomical because additional isocyanate compound are used. Besides, the separate addition process causes complexity and difficulty in operating the method.

SUMMARY OF THE INVENTION

Therefore, it is an object of the present invention to provide an aliphatic copolyester superior in melt viscosity and melt strength.

It is an object of the present invention to provide an aliphatic copolyester superior in draw ratio.

It is a further object of the present invention to provide a method for producing an aliphatic copolyester film, capable of improving physical properties of the film.

In accordance with the present invention, the above objects can be accomplished by a provision of a method for the production of aliphatic copolyester film, comprising the steps of: applying esterification or ester-interchange to a reaction mixture of at least one acid component selected from the group consisting of succinic acid, succinic anhydride and succinic acid ester, 1,4-butanediol as a main diol component, 2,2-dimethyl-1,3-propanediol of 1 to 30% by mole based on the mole of the acid component, multifunctional compound of 0.01 to 1% by mole based on the mole of the acid component, multifunctional compound have more than three functional group of hydroxy group or carboxy group at below 220° C., so as to give an oligomer mixture; polycondensing the oligomer into an aliphatic copolyester at a temperature of 240° to 260° C. under reduced pressures of not more than 1 mmHg in the presence of a catalyst; and melt-extruding the aliphatic copolyester using T die.

These and other objects and advantages of the present invention will become more apparent as the following description proceeds

DETAILED DESCRIPTION OF THE INVENTION

The aliphatic copolyseters provided by the present invention comprise composition consisting essentially of aliphatic dicarboxylic acids, diols, at least multifunctional compounds, and monomers to control crystallinity.

As a main component of the aliphatic copolyester of the present invention, an aliphatic dicarboxylic acid is selected from the group consisting of succinic acid, succinic anhydride and succinic acid ester. Preferred succinic acid ester used in the present invention includes dimethyl succinate, diethyl succinate, dipropyl succinate, dibutyl succinate, dioctyl succinate and the like.

The diol, another main component used in the copolyesters of the present invention, is preferably 1,4-butane diol.

In view of the physical properties and color of the polymer, it is advantageous that the mole ratio of the dicarboxylic acid to the 1,4-butane diol is in a range of approximately 1:1 to 1:2 and preferably 1:1.2 to 1.7.

For a compound to control the crystallinity, 2,2-dimethyl-1,3-propanediol is used in the present invention. This compound is efficient to lower the crystallization rate because of its bulky side chain, —$CH_3$ group attached.

This crystallinity-controlling compound is preferably added in amounts ranging from 1 to 30% by mole based on the mole of the dicarboxylic acid, and more preferably 1 to 25% by mole. For example, if the amount of 2,2-dimethyl-1,3-propanediol exceeds 30% by mole, the copolyesters produced are overly reinforced with the characteristics of elastomer, so that they are insufficient for the blown film or for blow molding. On the other hand, if the compound is used below 1% by mole, the addition thereof is brought into little effect.

For the at least multifunctional compound used in the present invention, the functional group is preferably hydroxy or carboxy. Preferred at least multifunctional compounds include trimethylol propane, trimethylol ethane, glycerine, pentaerythritol, dipentaerythritol, tris(2-hydroxyethyl) isocyanurate, trimellitic acid, trimellitic anhydride, benzene tetracarboxylic acid, benzene tetracarboxylic anhydride. By virtue of the copolymeric reaction of the multifunctional compound, the resulting polymers are remarkably increased in molecular weight and hence greatly improved in melt viscosity and melt strength.

It is critical that the at least multifunctional compounds are copolymerized in an amount of 0.01 to 1% by mole based on the mole of the dicarboxylic acid used. For example, if they are copolymerized in amounts exceeding 1% by mole, the polymerization reaction is completed in short times, so as to obtain high molecular weight polymers but the degree of crosslinking is rapidly raised, which leads to the formation of gel, unsuitable polymeric state to be molded. On the other hand, if the at least multifunctional compounds are used in an amount of less than 0.01% by mole, the addition thereof is brought into no or little effect.

According to the present invention, an aliphatic copolyester film is produced by applying esterification or ester-interchange to a reaction mixture of at least one acid component selected from the group consisting of succinic acid, succinic anhydride and succinic acid ester, 1,4-butanediol, 2,2-dimethyl-1,3-propanediol 1 to 30% by mole based on the mole of the acid component, multifuntional compound of 0.01 to 1% by mole based on the mole of the acid component at below 220° C., so as to give an oligomer mixture, polycondensing the oligomer into an aliphatic copolyester at a temperature of 240° to 260° C. under reduced pressures of not more than 1 mmHg in the presence of a catalyst, and melt-extruding the aliphatic copolyester using T die.

In order to minimize the formation of by-product and thermal decomposition, the esterification or ester interchange is preferably carried out at reaction temperatures below 220° C.

As to the catalyst used in the polycondensation, tin-containing compounds or titan-containing compounds are useful. As the tin-containing compounds, there are exemplified tin oxides, such as stannous oxide and stannic oxide, tin halides such as stannous chloride and stannic chloride, stannous sulfides, and organic tin compounds such as monobutyl tin oxide, dibutyl tin oxide, monobutylhydroxy tin oxide, dibutyl tin dichloride, tetraphenyl tin and tetrabutyl tin. As the titan-containing compound, tetrabutyl titanate, tetramethyl titanate, tetraisopropyl titanate, or tetra(2-ethylhexyl) titanate may be used. The amount of the catalyst used in the polycondensation is preferably on the order of approximately $1.0 \times 10^{-4}$ to $1.0 \times 10^{-3}$ mole per gram of oligomers obtained in the esterification or ester interchange. For example, if too much catalyst is used, discoloration of polymer takes place. On the other hand, if too little catalyst is used, the reaction rate becomes slow.

Besides the above-mentioned components, the copolyesters according to the present invention may include other additives including a thermal stabilizer and a nucleating agent.

With regard to the thermal stabilizer, useful is a phosphorous-containing compound, such as phosphoric acid, monomethyl phosphoric acid, trimethyl phosphoric acid, tributyl phosphoric acid, trioctyl phosphoric acid, monophenyl phosphoric acid, triphenyl phosphoric acid and derivatives thereof, phosphorous acid, triphenyl phosphorous acid, trimethyl phosphorous acid and derivatives thereof, and phenyl phosphonic acid, among which phosphoric acid, trimethyl phosphoric acid and triphenyl phosphoric acid are excellent. Besides, Irganox 1010, Irganox 1222 and Igafos 168, all of which are trade names commercially available from Ciba-geigy company. When used as a thermal stabilizer, the phosphorous-containing compound is added in an amount of approximately $1.0 \times 10^{-6}$ to approximately $1.0 \times 10^{-3}$ mole per gram of the oligomer obtained by esterification or ester interchange.

For a nucleating agent, titan dioxide, talc, sodium sulfide, or silicon dioxide may be used.

For the purpose of high molecular weight copolyester with a high melt viscosity and melt strength, it is important to polycondense the oligomer at high vacuum states and efficient at reaction temperatures ranging from approximately 240° to approximately 260° C. For example, if the reaction temperature is below 240° C., the reaction rate in the polycondensation is very slow, so that a polymer with a desired molecular weight is difficult to obtain. On the other hand, if the reaction temperature exceeds 260° C., pyrolysis takes place so extremely that the color or physical properties of the polymer become inferior.

Melt strength of the copolyesters of the present invention is determined according to ASTM D 3835 by extruding the molten polymer downward through a die 0.1 inch in diameter and 0.25 inches long at a shear rate of 20 second$^{-1}$ using as Instron rheometer and allowing the extrudate to fall freely. The diameter of the end of a six inch length of extrudate (measured from the exit face of the die) is measured. The percent melt strength is determined from the formula:

$$\text{Melt Strength} = \frac{D_{MELT} - D_{DIE}}{D_{DIE}} \times 100$$

wherein $D_{DIE}$ is the diameter of the rheometer (=0.1 inch), $D_{MELT}$ is the diameter, in inches, of the extrudate supporting a six inch length of extrudate.

It is known that there is a close correlation between percent melt strength and suitability for extrusion blow-molding and the copolyesters having a melt strength percent of at least 10 are used to extrusion blow-mold articles (U.S. Pat. No. 4,983,711). The aliphatic copolyesters provided by the present invention have a melt strength of 10 or greater.

The preferred embodiment of the present invention will now be further described with reference to specific examples.

EXAMPLE 1

Into a reactor equipped with a stirrer and a condenser, 136 g (1.5108 mole) of 1,4-butane diol (hereinafter referred to as "BD"), 12 g (0.1152 mole) of 2,2-dimethyl-1,3-propane diol (hereinafter referred to as "NPG"), 137 g (1.1601 mole) of succinic acid (hereinafter referred to as "SA"), 0.7 g (0.0058 mole) of trimethylol ethane (hereinafter referred to as "TME"), and 1.02 g (0.0003 mole) of a slurry of catalyst (hereinafter referred to as "CAT") which had been obtained by stirring a mixture of 90% by weight of BD and 10% by weight of tetrabutyl titanate for 3 hours were charged.

The reactor was heated from room temperature to 120° C. over 40 minutes and then to 210° C. over 120 minutes with stirring, so as to react the contents. Thereafter, water, the by-product, was completely drained through into the condenser.

Over 45 minutes, the pressure within the reactor was slowly reduced into 0.5 mmHg and the temperature was raised upto 245° C., simultaneously with stirring for 120 minutes. After the stirring, nitrogen gas was charged into the reactor and a high pressure was applied, so as to give an aliphatic copolyester resin.

The resin obtained was melt at 180° C. through an extruder and then formed into an compressed film through a T die, which was subsequently drawn in 4×3 times at 85° C., so as to give a transparent film with a thickness of 25 to 30 μm.

Physical properties for the resin and film were measured as follows:

Intrinsic Viscosity: polymer is dissolved in orthochloro phenol at 30° C. and then its intrinsic viscosity is measured using a capillary viscometer.

Crystallization Melting Point: a differential thermal analyzer is used (°C.).

Melt Viscosity: using a rheometer commercially available from Rheometric Company under a trade name of RDS-7700, at 190° C. and at $10^3 sec^{-1}$.

Weight Average Molecular weight: using gel penetration chromatography.

Tensile Strength: according to ASTM D 412 (kg/cm$^2$).

Elongation at Rupture: according to ASTM D 412 (%). and the results are given as shown in the following Table 2.

EXAMPLES 2 TO 10 AND COMPARATIVE EXAMPLES 1 TO 3

Aliphatic copolyesters and films were prepared in a manner similar to that of Example 1, except that the amount of NPG and the amount and kind of the multifunctional compound were employed as given in the following Table 1.

Physical properties also were measured as stated in Example 1 and the results are given as shown in the following Table 2.

EXAMPLES 11 AND 12 AND COMPARATIVE EXAMPLE 4

Into a reactor equipped with a stirrer and a condenser, such components as are given in the following Table 3 were charged.

The reactor was heated from room temperature to 120° C. over 40 minutes and then to 210° C. over 120 minutes with stirring, so as to react the contents. Thereafter, methanol, the by-product, was completely drained through into the condenser.

Over 45 minutes, the pressure within the reactor was slowly reduced into 0.5 mmHg and the temperature was raised upto 248° C., simultaneously with stirring for 120 minutes. After the stirring, nitrogen gas was charged into the reactor and a high pressure was applied, so as to give an aliphatic copolyester resin.

An aliphatic copolyester film was produced in a manner similar to that of Example 1.

The aliphatic copolyester and film was tested for it physical properties and the results are given as shown in Table 4.

EXAMPLES 13 AND 14 AND COMPARATIVE EXAMPLE 5

Into a reactor equipped with a stirrer and a condenser, such components as are given in the following Table 3 were charged.

The reactor was heated from room temperature to 120° C. over 40 minutes and then to 210° C. over 120 minutes with stirring, so as to react the contents. Thereafter, ethanol, the by-product, was completely drained through into the condenser.

Over 45 minutes, the pressure within the reactor was slowly reduced into 0.5 mmHg and the temperature was raised upto 252° C., simultaneously with stirring for 120 minutes. After the stirring, nitrogen gas was charged into the reactor and a high pressure was applied, so as to give an aliphatic copolyester.

An aliphatic copolyester film was produced in a manner similar to that of Example 1.

The aliphatic copolyester and film was tested for it physical properties and the results are given as shown in Table 4.

EXAMPLES 15 AND 16

Into a reactor equipped with a stirrer and a condenser, such components as are given in the following Table 3 were charged.

The reactor was heated from room temperature to 120° C. over 40 minutes and then to 210° C. over 120 minutes with stirring, so as to react the contents. Thereafter, propanol, the by-product, was completely drained through into the condenser.

Over 45 minutes, the pressure within the reactor was slowly reduced into 0.5 mmHg and the temperature was raised upto 251° C., simultaneously with stirring for 120 minutes. After the stirring, nitrogen gas was charged into the reactor and a high pressure was applied, so as to give an aliphatic copolyester.

An aliphatic copolyester film was produced in a manner similar to that of Example 1.

The aliphatic copolyester and film was tested for it physical properties and the results are given as shown in Table 4.

EXAMPLES 17

Into a reactor equipped with a stirrer and a condenser, such components as are given in the following Table 3 were charged.

The reactor was heated from room temperature to 120° C. over 40 minutes and then to 210° C. over 120 minutes with stirring, so as to react the contents. Thereafter, butanol, the by-product, was completely drained through into the condenser.

Over 45 minutes, the pressure within the reactor was slowly reduced into 0.5 mmHg and the temperature was raised upto 246° C., simultaneously with stirring for 120 minutes. After the stirring, nitrogen gas was charged into the reactor and a high pressure was applied, so as to give an aliphatic copolyester.

An aliphatic copolyester film was produced in a manner similar to that of Example 1.

The aliphatic copolyester and film was tested for it physical properties and the results are given as shown in Table 4.

TABLE 1

| Example No. | SA | BD | NGP | TME | TMP | TMA | TMAN | PNT | DPNT | GLY | CAT |
|---|---|---|---|---|---|---|---|---|---|---|---|
| 1 | 137 | 136 | 12 | 0.7 | — | — | — | — | — | — | 1.02 |
| C1 | 137 | 136 | — | — | — | — | — | — | — | — | 1.02 |
| C2 | 137 | 136 | 12 | — | — | — | — | — | — | — | 1.02 |
| 2 | 137 | 136 | 12 | — | 0.8 | — | — | — | — | — | 1.02 |
| 3 | 137 | 136 | 12 | — | — | 1.2 | — | — | — | — | 1.02 |
| 4 | 137 | 136 | 12 | — | — | — | 1.1 | — | — | — | 1.02 |
| 5 | 137 | 136 | 12 | — | — | — | — | 0.8 | — | — | 1.02 |
| 6 | 137 | 136 | 12 | — | — | — | — | — | 1.1 | — | 1.02 |
| 7 | 137 | 136 | 12 | — | — | — | — | — | — | 0.6 | 1.02 |
| C3 | 137 | 136 | 36,3 | 0.7 | — | — | — | — | — | — | 1.02 |
| 8 | 137 | 136 | 8 | — | — | 0.7 | — | — | — | — | 1.02 |
| 9 | 137 | 136 | 15 | — | — | — | — | 0.8 | — | — | 1.02 |
| 10 | 137 | 136 | 10 | — | — | — | — | — | — | 0.5 | 1.02 |

*SA: succinic acid
BD: 1,4-butanediol
NGP: 2,2-dimethyl-1,3-propanediol,
TME: trimethylol ethane
TMP: trimethylol propane
TMA: trimellitic acid
TMAN: trimellitic anhydride,
PNT: pentaerythritol
DPNT: dipentaerythritol,
GLY: glycerine
CAT: catalyst slurry

TABLE 2

| Example No. | MP (°C.) | IV (dl/g) | MV (poise) | Mw | UST (kg/cm$^2$) | Elon (%) |
|---|---|---|---|---|---|---|
| 1 | 105.7 | 1.426 | 2,700 | 235,000 | 650 | 250 |
| C1 | 114.1 | 1.178 | 1,200 | 78,000 | # | — |
| C2 | 105.6 | 1.182 | 1,300 | 115,000 | 300 | 260 |
| 2 | 106.3 | 1.435 | 2,500 | 264,000 | 590 | 190 |
| 3 | 107.4 | 1.470 | 2,900 | 221,000 | 580 | 175 |
| 4 | 106.6 | 1.501 | 2,700 | 218,000 | 620 | 190 |
| 5 | 106.0 | 1.382 | 2,900 | 268,000 | 635 | 200 |
| 6 | 107.4 | 1.424 | 3,100 | 215,000 | 670 | 175 |
| 7 | 105.8 | 1.395 | 2,600 | 249,000 | 640 | 220 |
| C3 | 78.4 | 1.388 | 2,900 | 238,000 | 540 | 220 |
| 8 | 110.5 | 1.483 | 2,500 | 219,000 | 560 | 180 |
| 9 | 102.5 | 1.406 | 2,700 | 222,000 | 635 | 220 |
| 10 | 108.3 | 1.422 | 3,000 | 215,000 | 670 | 230 |

*MP: melting point,
IV: intrinsic viscosity
MV: melt viscosity,
Mw: molecular weight
UST: tensile strength of film,
Elon: elongation ratio at break
: heterogeneously elongation

TABLE 4

| Example No. | MP (°C.) | IV (dl/g) | MV (poise) | Mw | UST (kg/cm$^2$) | Elon (%) |
|---|---|---|---|---|---|---|
| 11 | 105.7 | 1.422 | 2,500 | 214,000 | 670 | 230 |
| 12 | 109.2 | 1.478 | 2,600 | 241,000 | 555 | 210 |
| C4 | 78.3 | 1.205 | 1,200 | 114,000 | 280 | 350 |
| 13 | 106.1 | 1.442 | 2,900 | 232,000 | 560 | 190 |
| 14 | 103.4 | 1.397 | 3,100 | 244,000 | 640 | 185 |
| C5 | 78.1 | 1.187 | 1,300 | 125,000 | 260 | 340 |
| 15 | 102.7 | 1.406 | 2,800 | 221,000 | 615 | 200 |
| 16 | 104.5 | 1.425 | 2,700 | 232,000 | 560 | 185 |
| 17 | 105.0 | 1.433 | 2,000 | 253,000 | 660 | 190 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

TABLE 3

| Example No. | DMS | DES | DPS | DBS | BD | NGP | TME | TMA | PNT | CAT | DPNT |
|---|---|---|---|---|---|---|---|---|---|---|---|
| 11 | 170 | — | — | — | 136 | 10 | 0.6 | — | — | — | 1.02 |
| 12 | 170 | — | — | — | 136 | 7.0 | — | — | 0.6 | — | 1.02 |
| C4 | 170 | — | — | — | 136 | 36.3 | — | — | — | — | 1.02 |
| 13 | — | 202 | — | — | 136 | 10.0 | — | — | — | 0.8 | 1.02 |
| 14 | — | 202 | — | — | 136 | 13.0 | — | 0.6 | — | — | 1.22 |
| C5 | — | 202 | — | — | 136 | 36.3 | — | — | — | — | 1.22 |
| 15 | — | — | 235 | — | 136 | 14.0 | — | 0.5 | — | — | 0.95 |
| 16 | — | — | 235 | — | 136 | 11.0 | — | — | 0.9 | — | 1.02 |
| 17 | — | — | — | 267 | 136 | 12.0 | 0.5 | — | — | — | 1.05 |

*DMS: dimethyl succinate,
DES: diethyl succinate
DPS: dipropyl succinate,
DBS: dibutyl succinate
BD: 1,4-dibutane diol,
NGP: 2,2-dimethyl-1,3-propanediol,
TME: trimethylol ethane
TMA: trimellitic acid
PNT: pentaerythritol
DPNT: dipentaerythritol
CAT: catalyst slurry 1. A method of the production of aliphatic polyester film, comprising the steps of:

applying esterification or ester-interchange at below 220° C. to a reaction mixture of
- at least one acid component selected from the group consisting of succinic acid, succinic anhydride and succinic acid ester,
- 1,4-butanediol as a main diol component,
- 2,2-dimethyl-1,3-propanediol of 1 to 30% by mole based on the mole of the acid component
- multifunctional compound of 0.01 to 1% by mole based on the mole of the acid component, multifunctional compound have more than three functional group of hydroxy group or carboxy group;

polycondensing the oligomer into an aliphatic co-polyester at a temperature of 240° to 260° C. under reduced pressures of not more than 1 mmHg in the presence of a catalyst; and melt-extruding the aliphatic copolyester using T die.

2. A method of the production of aliphatic copolyester film set forth as claim 1, wherein the at least trifunctional compound is one or more compound selected from the group consisting of trimellitic acid, trimellitic anhydride, trimethylol ethane, trimethylol propane, pentaerythritol, dipentaerythritol and glycerine.

3. A method of the production of aliphatic copolyester film set forth as claim 1, wherein succinic acid compound is selected from the group consisting of dimethyl succinate, diethyl succinate, dipropyl succinate and dibutyl succinate.

* * * * *